United States Patent [19]

Andreussi et al.

[11] Patent Number: 5,894,051
[45] Date of Patent: Apr. 13, 1999

[54] POLYAMIDE AND ACRYLIC RUBBER MANUFACTURED PRODUCTS AND PROCESS FOR THEIR PREPARATION

[75] Inventors: Piero Andreussi, Milan; Aroldo Biggi, S. Donato Mil.se; Arturo Carrano, Vercelli; Cristina Gobbi, S. Donato Mil.se, all of Italy

[73] Assignee: Zeon Chemicals Incorporated, Louisville, Ky.

[21] Appl. No.: 08/782,172

[22] Filed: Jan. 14, 1997

[30] Foreign Application Priority Data

Aug. 2, 1996 [IT] Italy ................... MI96A1671

[51] Int. Cl.[6] .................... B32B 27/08; B32B 31/26
[52] U.S. Cl. .................... 428/474.4; 428/476.3; 428/476.1; 428/476.9; 428/492; 428/475.5; 428/475.8; 525/183; 525/66; 427/372.2; 427/384; 427/385.5; 156/307.1; 156/307.3; 156/310; 156/311
[58] Field of Search .................. 428/474.4, 475.5, 428/476.3, 475.8, 476.1, 476.9, 492; 525/183, 66; 427/372.2, 384, 385.5; 156/310, 311, 307.1, 307.3

[56] References Cited

U.S. PATENT DOCUMENTS 5,478,889  12/1995  Biggi ........................... 525/183

*Primary Examiner*—Leszek Kiliman
*Attorney, Agent, or Firm*—Armstrong, Westerman, Hattori, McLeland & Naughton

[57] ABSTRACT

Multilayer material, essentially without adhesives between the various layers, particularly with two or three layers, consisting of at least one layer of aliphatic polyamide and at least one layer, alternating with the polyamidic layer, of vulcanized acrylic rubber, the above materials being characterized by a peeling strength (between the polyamidic layer and the vulcanized acrylic rubber layer) of more than 5 daN/cm.

The process for the preparation of the above material is also described.

15 Claims, No Drawings ns.894,051

POLYAMIDE AND ACRYLIC RUBBER MANUFACTURED PRODUCTS AND PROCESS FOR THEIR PREPARATION

The present invention relates to polyamide and vulcanized acrylic rubber end-products and the process for their preparation.

The necessity has been felt to substitute, when possible, components with a rubber-metal bonding with others in which plastic materials replace the metal, for example in the car industry in order to reduce weight and consequently to save fuel consumption.

In the preparation of these components the metals had to be previously prepared by costly surface treatment of the physical type (for example blasting and degreasing) and chemical type (for example treatment with acids or spreading with adhesives).

The necessity was therefore felt for substituting these metal-rubber components with plastic-rubber components with which, with the same bonding properties, it was possible to avoid surface treatment of the plastic part.

A process has now been found which enables rubber-plastic components to be obtained which are capable of substituting the traditional rubber-metal components, using a direct rubber-plastic bonding which does not require the use of adhesives.

In accordance with this, the present invention relates to a process for obtaining materials with two or more layers, preferably two or three layers, of which at least one essentially consisting of an aliphatic polyamide and at least one, alternating with the polyamidic layer, essentially consisting of vulcanized acrylic rubber, which comprises the following steps:

1) preparation of a first end-product (i) essentially consisting of an aliphatic polyamide, preferably nylon 6;
2) deposition on at least a part of the end-product (i) of a composition (ii) essentially consisting of a mixture of non-vulcanized acrylic rubber, the above acrylic rubber having as active sites for the vulcanization groups selected from epoxides and/or carboxylic groups; thus obtaining an end-product (iii) essentially consisting of at least one polyamidic layer and at least one layer of acrylic rubber mixture;
3) vulcanization of the end-product (iii) to give an end-product with two or more layers (iiii) wherein at least one polyamidic layer is firmly bound, essentially without adhesives, to at least one layer of vulcanized acrylic rubber.

The above process allows the production of a material consisting of at least one polyamidic layer and at least one vulcanized acrylic rubber layer, or a material with three layers of which the internal layer consists of a polyamidic material and the external layers of vulcanized acrylic rubber.

The term acrylic rubber refers to elastomers well known to experts and described, for example, in Kirch-Othmer, Encyclopedia of Chemical Technology, Vol. 8, pages 923–934.

The above acrylic rubbers are essentially polyacrylates having general formula —|—CH$_2$—CH(COOR)—|$_n$—, wherein R is selected from an alkyl radical containing from 1 to 18 carbon atoms, an alkoxyalkyl or alkylthioalkyl radical containing a total of from 2 to 12 carbon atoms, a cyanoalkyl radical having from 2 to 12 carbon atoms. The alkyl group can be primary, secondary or tertiary, cyclic or non-cyclic. Examples of these acrylates are methyl acrylate, ethyl acrylate, n-butyl acrylate, isobutyl acrylate, n-hexyl acrylate, 2-methyl-pentyl acrylate, n-octyl acrylate, 2-ethylhexyl acrylate, n-decyl acrylate, n-dodecyl acrylate, n-octadecyl acrylate.

With respect to alkoxyalkyl acrylates, typical examples are methoxymethyl acrylate, methoxyethyl acrylate, ethoxyethyl acrylate, butoxyethyl acrylate, ethoxypropyl acrylate.

Typical examples of alkylthioalkyl radicals are methylthioethyl acrylate and hexylthioethyl acrylate.

As far as cyanoalkyl acrylates are concerned, alpha and beta cyanoethyl acrylate, alpha, beta or gamma cyanopropylacrylate, cyanobutylacrylate, cyanohexylacrylate, cyanooctyl acrylate, should be mentioned.

Mixtures of two or more monomers and/or types of acrylate can obviously also be used.

In the preferred embodiment, the acrylic rubber contains from about 70% to about 99.8% of acrylates wherein R is an alkyl radical with from 1 to 10 carbon atoms or an alkoxyalkyl radical with from 2 to 8 carbon atoms.

Examples of the most preferred acrylates are ethyl acrylate, propyl acrylate, butyl acrylate, hexyl acrylate, 2-ethylhexyl acrylate, octyl acrylate, methoxymethyl acrylate, ethoxyethyl acrylate and the relative mixtures.

In the polymeric chain of the acrylic rubbers, comonomers (called "cure-site monomers") are also present, in a very small quantity, to facilitate the vulcanization processes. The most well-known monomers which can be used for the purpose are those having a chlorine atom, or a carboxylic acid or an unsaturation.

Among the above acrylic rubbers only acrylic rubbers having carboxylic acids and/or epoxides as reactive sites, particularly those having both carboxylic groups and epoxidic groups as reactive sites, can be applied to the process of the present invention. In the preferred embodiment the above acrylic rubbers have a content of epoxidic and/or carboxylic groups from 0.2 to 30%, preferably from 1.5 to 7% by weight. In an even more preferred embodiment the acrylic rubber has both reactive sites, the quantity of carboxyls being from 0.5 to 2% and the quantity of epoxides being from 2 to 4%.

The above acrylic rubbers which can be used in the process of the present invention can also contain unsaturations, but in any case carboxylic and/or epoxidic groups must always be present. Acrylic rubbers having as single reactive sites halogen groups, particularly chlorine, or unsaturated groups, cannot therefore be applied to the present invention.

On the other hand, acrylic rubbers consisting of copolymers between acrylates and olefins, particularly ethylene, form part of the present invention. It is therefore possible to use copolymers between alkyl acrylates and olefins, in the process of the present invention, the content of olefin being up to a maximum of 60% by weight. The presence of the above reactive sites is however compulsory.

With respect to the aliphatic polyamide, this can be selected from any aliphatic polyamide, such as nylon 6, nylon 6—6, nylon 12.

In the preferred embodiment, the first step of the process of the present invention consists in the moulding of the polyamide. This operation can be easily carried out with any of the techniques normally used, in particular injection or compression moulding, preferably injection moulding.

One or more layers of non-vulcanized acrylic rubber mixture is then deposited on at least a part of the polyamidic layer.

The term non-vulcanized acrylic rubber mixture refers to the mixture of non-vulcanized acrylic rubber and other components normally used in the formulation of the above mixtures. In fact, in addition to the acrylic rubber and vulcanizing composition, the above mixtures may also normally contain other compounds such as retarding agents, antioxidants, aging inhibitors, plasticizers, fillers.

As far as the vulcanizing composition is concerned, this can be selected from:

(v1) a quaternary ammonium salt having the general formula $(R)_4—N^+X^-$, wherein R is selected from monofunctional hydrocarbyl radicals having from 1 to 25 carbon atoms and $X^-$ is a monofunctional anion, preferably selected from halogens, sulfates, bisulfates, hydroxides;

(v2) an aliphatic or aromatic polyamine or polyamides and the relative derivatives, polyurea, polyurethanes;

(v3) a mixture of a polythioltriazine, preferably trithioltriazine, and a second component selected from thiourams, dithiocarbamates and the relative salts, thiazoles, metal oxides.

Among the plasticizers which can be used in the preparation of the acrylic rubber mixtures, dialkyl esters of phthalic acid; dialkyl esters of adipic acid, sebacic acid (for example, di-2-ethyl sebacate), azelaic acid and the relative polymeric esters of the above acids, can be mentioned. The above plasticizers an be used in a quantity from 4 to 50 parts per 100 arts of acrylic rubber.

Among the retarding agents, the derivatives of aromatic and aliphatic imides, aliphatic and aromatic thioureas, fatty acids, aromatic and aliphatic bicarboxylic acids, can be used. The retarding agents are normally used in a quantity of up to 2 parts per 100 parts of acrylic rubber.

Among the antioxidants and anti-aging agents, aromatic amines, sterically hindered phenols, phosphites, sterically hindered amines, can be used, normally in a quantity of up to 4 parts per 100 parts by weight of acrylic rubber.

Among the fillers, carbon black, kaolin, talc, silica, silicates and mica can be used; these are typically present in a quantity of up to 100 parts by weight per 100 parts of acrylic rubber.

In addition to the above compounds, the acrylic rubber mixtures can also possibly contain other compounds, for example pigments and dyes.

The mixtures of acrylic rubber described above are deposited on one or both sides of the polyamidic layer, preferably by means of injection or compression moulding.

Step (3), i.e. the vulcanization of the acrylic rubber, can be carried out using any of the well-known techniques such as compression, injection, injection-compression, transfer moulding or extrusion/co-extrusion with or without a pressure-resistant reactor, preferably compression moulding. In the preferred embodiment step (3) takes place immediately after step (2).

The conditions (temperature and times) of step (3) are those normally used in vulcanization processes of mixtures of non-vulcanized acrylic rubber. The times are usually between 5 and 30 minutes at a temperature of between 150° C. and 200° C., preferably between 160° C. and 190° C. Typical examples are 5 minutes at 190° C., minutes at 180° C., 15 minutes at 170° C., 30 minutes at 160° C.

It has been surprisingly found that these conditions, usually adopted to vulcanize acrylic rubber, enable not only the vulcanization of acrylic rubber but also a strong adhesion between the polyamide layer and the layer(s) of vulcanized acrylic rubber. In the above step (3) there is also likely to be, in addition to the cross-linking of the acrylic rubber, a real chemical reaction between the polyamide and acrylic rubber.

The process of the present invention is simple and easy to effect. Among the advantages of the process of the present invention, it should be remembered that:

1) the adhesion between the polyamidic layer and the acrylic rubber layer does not require the presence of adhesives;

2) the surface of the polyamidic layer and/or acrylic rubber layer does not require any previous treatment (either chemical or physical), which on the contrary is required in the case of adhesion between metal surfaces and elastomeric materials;

3) there is no need for the presence (in the polyamide or acrylic rubber) of any substance suitable for promoting the assumed reaction between polyamidic material and acrylic rubber.

The process of the present invention allows the production of multilayer materials, essentially without adhesives, particularly with two or three layers, consisting of at least one layer of aliphatic polyamide and at least one layer, alternating with the polyamidic layer, of vulcanized acrylic rubber, the above materials being characterized by a peeling strength (between polyamidic layer and vulcanized acrylic rubber layer) of more than 5 daN/cm, preferably of more than 6 daN/cm. The above peeling strength is measured with a dynamometer according to method B of ASTM D 429.

The multilayer materials of the present invention are stable to aging and oxidation, both with respect to the single layers and to the adhesion between them.

Typical examples of the above manufactured products in the automobile industry are static gaskets (for example seals for the engine head, valve cover gasket, oil cup, transmission elements, oil pump, oil filter, water radiators and heat exchangers) and dynamic gaskets (for example sealing rings for the transmission shaft and drive shafts), pipes (for example for adduction and recovery oil and oil-fuel mixtures, oil transmission cooling, power steering fluid, cooling fluids) and joints in general, isolator articles, coating structures for isolating vibrations and noise or for thermal insulation.

The end-products of the present invention (consisting of recyclable materials) avoid the use of metals, thus saving weight and adhesives. Finally, the above products have improved vibration damping characteristics both mechanical and induced by transported fluid elements.

The following examples provide a better understanding of the present invention.

EXAMPLES

In the preparation of double-layer acrylic rubber and polyamide end-products, the following acrylic rubbers are used:

a) Europrene AR 153 EP of Enichem Elastomeri: this is ethyl polyacrylate having a content of carboxylic acids of 1% and a content of epoxides of 3%;

b) Europrene AR 156 LTR of Enichem Elastomeri: this is an ethyl and butyl polyacrylate and a third monomer, having a content of carboxylic acids of 1% and epoxides of 3%;

c) Commercial polymer I: this is an ethyl polyacrylate containing chlorine atoms as active site of the cross-linking;

d) Commercial polymer II: this is an ethyl and butyl polyacrylate containing chlorine atoms as active sites;

e) Commercial polymer III: this is an ethylenemethyl acrylate copolymer (41%–55%) having a content of carboxylic acids of 4%.

In all the experiments nylon 6 was used as polyamide.

EXAMPLE 1
DESCRIPTION OF THE PROCESS

The polyamide is moulded in the form of 3 mm thick strips. These strips are inserted in a suitable mould and a layer of aluminium is placed over them for half the length and finally a layer of non-vulcanized acrylic rubber mixture. The above acrylic rubber mixture contains, for 100 parts of polymer, 1 part of promoter, 2 parts of antioxidant, 2 parts of processing aid, 50 parts of carbon black, 1 part of vulcanizing agent.

The aluminium sheet, placed between the acrylic rubber and the nylon, avoids contact between the substrate and rubber during the moulding, to obtain a draft for the subsequent peeling tests.

The cross-linking reaction of the rubber (vulcanization) takes place as a result of the compression moulding (temperature between 160 and 190° C. for a time of between 5 and 30 minutes depending on the temperature). The resulting layer of vulcanized rubber has a thickness of 3 mm.

In the case of acrylic rubbers (a), (b) and (e), under the above conditions there is also a direct bonding between acrylic rubber and polyamide along the part not protected by the aluminium layer.

DESCRIPTION OF THE TEST

The peeling test according to ASTM D 429 method B is carried out on the end-products obtained with the above process. The test samples are stretched at a rate of 50 mm/min at room temperature.

The force necessary for tearing the rubber from the substrate is recorded for the whole duration of the test.

The results obtained were averaged on five experimental tests and provided the following values:

Europrene AR 153 EP/Nylon 6=8.5 daN/cm

Europrene AR 156 LTR/Nylon 6=6.3 daN/cm.

Commercial polymers I and II/Nylon 6=no bonding.

Commercial polymer III/Nylon=11 daN/cm.

At the end of the tearing the surface of the polyamide strip is also visibly evaluated.

In cases (a) and (b), the polyamide surface remained covered by a layer of rubber, indicating a firm rubber/nylon bonding. In case (e) only the corner of the polyamide strip was covered by residual rubber.

EXAMPLE 2

Several test samples prepared according to the process of example 1 and using materials included in the present invention were subjected to aging.

In particular test samples consisting of acrylic rubber of the type Europrene AR 153 EP+nylon 6 (test sample 1) and commercial polymer III+nylon 6 (test sample 2) were aged for 70 hours at 150° C. in air and then stretched at room temperature.

The results were the following:

Test sample 1: peeling force rate=11 daN/cm;

Test sample 2: peeling force rate=17 daN/cm

EXAMPLE 3

Several test samples prepared according to the process of example 1 starting from materials included in the present invention, were subjected to stretching at a temperature of 100° C., after being maintained at this temperature in air for 15 minutes.

In particular test samples consisting of acrylic rubber of the type Europrene AR 153 EP+nylon 6 (test sample 1) and commercial polymer III+nylon 6 (test sample 2).

The results were the following:

Test sample 1: peeling force rate=4.6 daN/cm;

Test sample 2: peeling force rate=1.5 daN/cm.

The tests of examples 2 and 3 prove the efficiency of the direct acrylic rubber-polyamide bonding process even when the peeling force determination tests take place at high temperatures or after thermal aging in air.

The thermal stability and resistance to oxidation of the components (rubber and polyamide) and their direct adhesion are also confirmed.

Finally it is useful to observe that in all cases of examples 2 and 3, after stretching the polyamide layer is still covered with a layer of rubber.

We claim:

1. A process for obtaining a material with two or more layers of which at least one layer consists essentially of an aliphatic polyamide layer and at least one consists essentially of a vulcanized acrylic rubber layer alternating with said polyamide layer, which comprises the following steps:
   1) preparing a first end-product (i) consisting essentially of an aliphatic polyamide layer;
   2) depositing on at least a part of the end-product (i) a composition (ii) consisting essentially of a mixture of non-vulcanized acrylic rubber, said acrylic rubber having as active sites for vulcanization groups selected from epoxides and/or carboxylic groups thereby obtaining an end-product (iii) consisting essentially of at least one polyamide layer and at least one acrylic rubber layer;
   3) vulcanizing the end-product (iii) to give an end-product with two or more layers (iiii) wherein at least one polyamide layer is to at least one vulcanized acrylic rubber layer.

2. The process according to claim 1, characterized in that the non-vulcanized acrylic rubber has a content of epoxidic and/or carboxylic groups of between 0.2 and 30% by weight.

3. The process according to claim 2, characterized in that the content of epoxidic and/or carboxylic groups is between 1.5 and 7% by weight.

4. The process according to claim 1, characterized in that the acrylic rubber has a content of carboxylic groups of between 0.2 and 2% and epoxidic groups of between 2 and 4%.

5. The process according to claim 1, characterized in that the acrylic rubber consists essentially of polyacrylates having the formula —|—CH$_2$—CH(COOR)—|$_n$—, wherein R is selected from an alkyl radical containing from 1 to 18 carbon atoms, an alkoxyalkyl or alkylthioalkyl radical containing a total of from 2 to 12 carbon atoms, a cyanoalkyl radical having from 2 to 12 carbon atoms.

6. The process according to claim 1, characterized in that the acrylic rubber is a copolymer of alkyl acrylates and olefins, the content of olefin being up to a maximum of 60% by weight.

7. The process according to claim 1, characterized in that the vulcanization (3) is carried out by compression molding.

8. The process according to claim 7, characterized in that the compression moulding is carried out at a temperature of between 150 and 200° C.

9. The process according to claim 1, characterized in that the aliphatic polyamide consists essentially of nylon 6.

10. A material of two or more layers consisting essentially of at least one layer of an aliphatic polyamide and at least one layer of a vulcanized acrylic rubber layer alternating with said polyamide layers, said material having a tear strength between the polyamide layer and the vulcanized acrylic rubber layer of more than 5 daN/cm.

11. The material according to claim 10, characterized in that the tearing strength is more than 6 daN/cm.

12. The material according to claim 10, characterized in that the aliphatic polyamide is nylon 6.

13. The process according to claim 1, wherein the material has two or three layers.

14. The process according to claim 8, wherein the compression molding is carried out at 160–190° C.

15. The material according to claim 10, having two or three layers.

* * * * *